United States Patent [19]

Danley et al.

[11] Patent Number: 4,841,495

[45] Date of Patent: Jun. 20, 1989

[54] HORN LOADED TRANSDUCER FOR ACOUSTIC LEVITATION

[75] Inventors: Thomas J. Danley, Highland Park; Charles A. Rey, Naperville, both of Ill.

[73] Assignee: Intersonics Incorporated, Northbrook, Ill.

[21] Appl. No.: 871,924

[22] Filed: Jun. 9, 1986

[51] Int. Cl.[4] .......................................... G01K 15/00

[52] U.S. Cl. .................................. 367/191; 181/0.5; 73/505

[58] Field of Search ................ 181/0.5, 177, 185, 187, 181/192, 195, 196; 367/137, 191; 73/505

[56] References Cited

U.S. PATENT DOCUMENTS

| | | | |
|---|---|---|---|
| 4,284,403 | 8/1981 | Rey | 181/0.5 |
| 4,333,796 | 6/1982 | Flynn | 376/100 |
| 4,393,706 | 7/1983 | Barmatz | 181/0.5 |
| 4,549,435 | 10/1985 | Barmatz et al. | 181/0.5 |
| 4,573,356 | 3/1986 | Barmatz et al. | 181/0.5 |
| 4,713,799 | 12/1987 | Phelan et al. | 181/185 |

*Primary Examiner*—Thomas H. Tarcza
*Assistant Examiner*—Daniel T. Pihulic
*Attorney, Agent, or Firm*—Juettner Pyle Lloyd & Verbeck

[57] ABSTRACT

A sound source coupled to an acoustic levitation chamber is provided with horn loading to improve efficiency and to protect the sound source from heat. A dish sound source may be used, and the horn may include a half wavelength pathway from the rear of the dish to provide additional efficiency.

10 Claims, 2 Drawing Sheets

FIG. 1
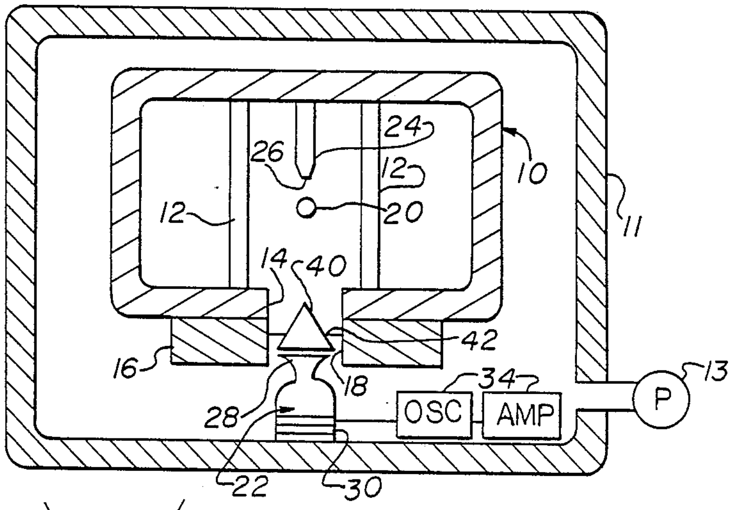
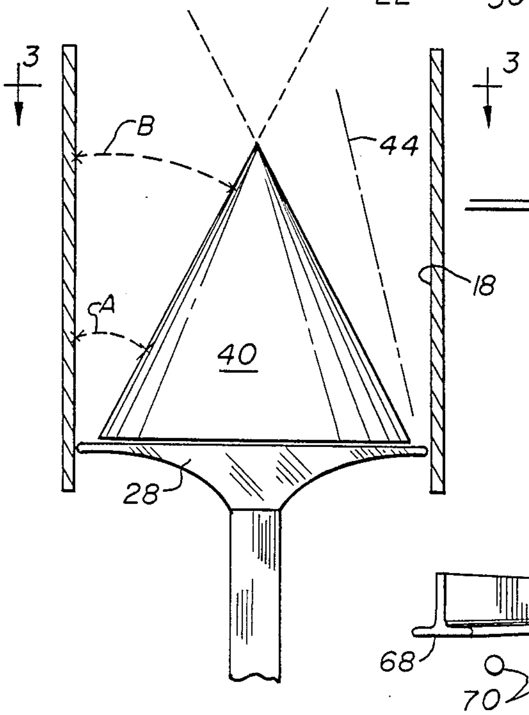
FIG. 2
FIG. 5
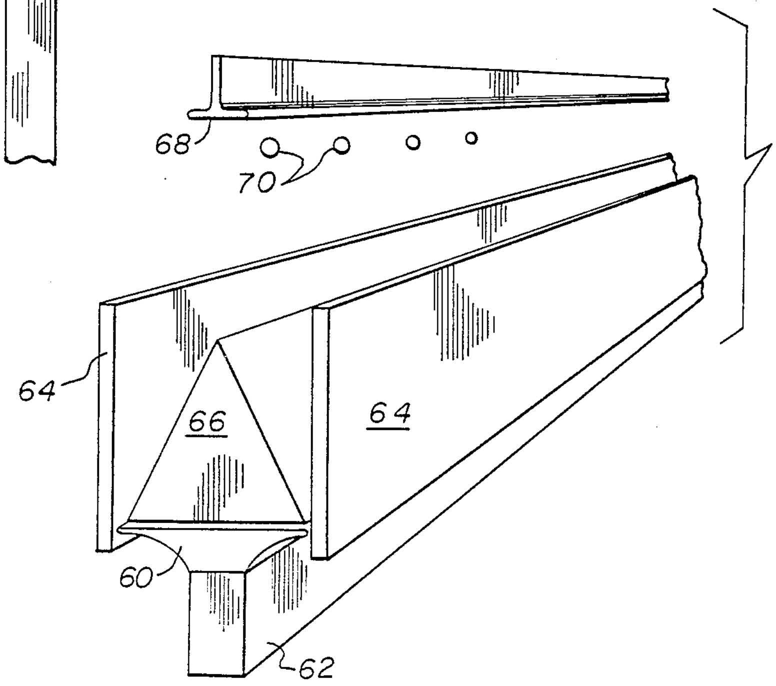

FIG. 3
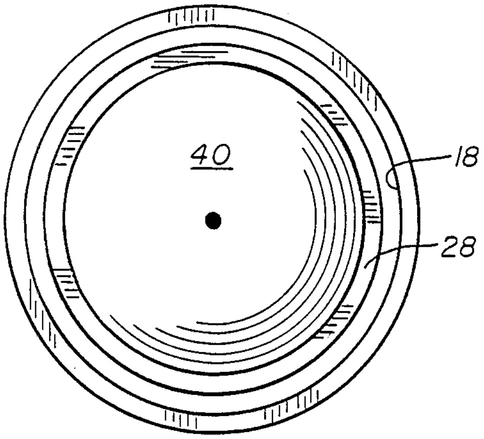
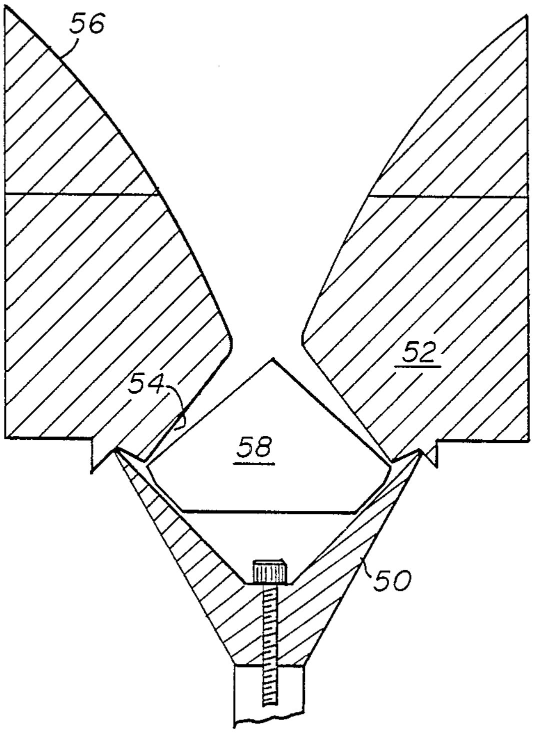
FIG. 4
FIG. 6
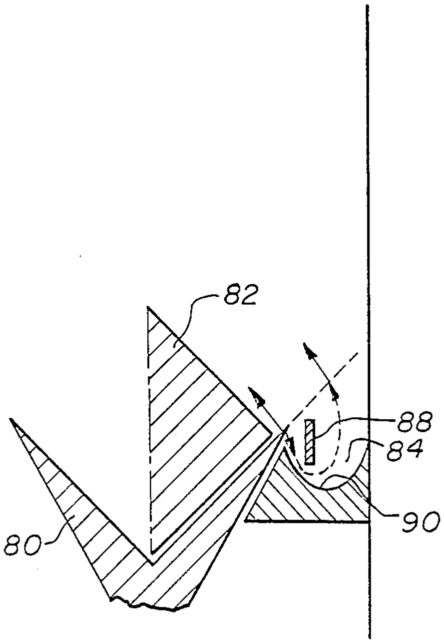

HORN LOADED TRANSDUCER FOR ACOUSTIC LEVITATION

BACKGROUND OF THE INVENTION

The principles of acoustic levitation are well known and are disclosed in various references. Generally, intense sound forces are employed to position or support an object. Some levitators utilize standing waves in a tuned cavity, as described in U.S. Pat. No. 3,882,732. Others employ interference from a reflector or from an opposed sound source, as described in U.S. Pat. No. 4,284,403. In all cases, reflected sound waves form zones of minimum pressure or energy wells in which objects may be levitated.

A major potential application for acoustic levitation is containerless melting. An object is levitated by acoustic forces and may be heated and cooled without the possibility of being contaminated by contact with a container. Several proposals have been made for the processing of acoustically positioned objects in future space stations.

To exert the forces necessary to levitate or position dense objects, it is desirable to produce coherent and intense sound in the region of the suspended object. In the past, the best available sources have been solid pistons, as described in U.S. Pat. No. 4,284,403. Such sound sources, however, are highly inefficient because of the poor impedance match between the piston and air. As a result, the use of large amounts of power are required to produce the required sound pressure levels.

The use of a furnace with acoustic levitation also poses several additional problems which have not been adequately resolved. The piston or sound source must be coupled to the furnace cavity and therefore is subjected to considerable heat flux, which may damage the source. Also, since the piston is cooler than the furnace, a temperature gradient is established between the source in the furnace. As the sound moves through the gas in the temperature gradient, the wavelength increases relative to the size of the source, causing increased dispersion of the sound and loss of levitating forces in the furnace. These problems become particularly severe at higher operating temperature, i.e., above 1500° C., since the amount of heat power radiated per unit area closely follows the fourth power temperature law.

Moreover, prior art acoustic levitation devices have only been considered practical for use in space or in an environment free of gravitational forces. It would be desirable to provide such a device which could be practically employed to levitate dense objects on earth, or against the force of gravity.

In view of the foregoing, it would be desirable to provide a sound source that could be used in a high temperature environment without excessive exposure to heat and without excessive dispersion of sound across a temperature gradient. Also, in general, it would be desirable to provide a more efficient sound source to increase the forces available for acoustic levitation.

SUMMARY OF THE INVENTION

The present invention uses a flexing resonant dish coupled to a vibrator to produce a coherent beam or column of sound at a fixed fundamental frequency, with most of the sound being produced at the edges of the dish. The dish is connected to the throat of a horn, with the mouth of the horn being connected to a furnace, chamber, or the like, wherein levitation of an object will take place. The sound from the source is beamed toward a reflector, which establishes the conditions for levitation.

The horn includes a tapered central plug which covers and projects the central portion of the dish except near the edges. The outer portion of the horn is a hollow sleeve which communicates with the levitation chamber.

Since the central plug is tapered, the sleeve and the plug together define a horn of increasing cross sectional area from the throat to the mouth.

The horn is preferably designed and constructed to provide constant directivity relative to the temperature gradients to be encountered, i.e., relative to the increasing sound wavelength gradient from the relatively cool throat to the hotter mouth. Thus, the break point of the horn is made constant for the frequency range concerned. As a result, a constant radiation angle is maintained, and there is no increased dispersion of sound at the hotter portion. Of course, if the horn is not subjected to a temperature gradient, constant directivity is not required.

THE DRAWINGS

FIG. 1 is a side view, partly in section, of the acoustic levitation device of the present invention coupled to a furnace.

FIG. 2 is a partial view of the device shown in FIG. 1, illustrating the sound source and the horn loading thereof.

FIG. 3 is a view taken along 3—3 of FIG. 2.

FIG. 4 is a vertical sectional view of another version of the sound source and horn of the present invention.

FIG. 5 is a perspective view of yet another version of the sound source and horn of the present invention.

FIG. 6 is a partial vertical sectional view of another version of the sound source and horn of the present invention.

DESCRIPTION OF THE PREFERRED EMBODIMENTS

As shown in FIG. 1, a conventional furnace 10 or other heating means is provided and may include a number of heating rods 12 connected to a power source (now shown). One of the walls of the furnace 10 has a circular opening 14, and a sleeve 16 of refractory material communicates with the opening to form an elongated hollow tube 18. Other types of heating methods may be employed, such as, for example, a laser.

One of a variety of types of acoustic levitation devices is used in conjunction with the furnace in order to levitate an object 20 within a stable fixed location within the furnace cavity. The levitation device shown in FIG. 1 uses the operating principles described in U.S. Pat. No. 4,284,403, incorporated herein by reference. The device includes a transducer 22 for producing a field of sound at a particular or nominal wavelength. A reflector 24 is spaced from the sound source and is located in the furnace. The reflector has an effective reflective surface 26 of less than four wavelengths of the sound such that a local energy well is created adjacent to the reflector, with the object 20 being supported in the energy well.

The transducer or sound source 22 preferably comprises a circular resonant dish 28 connected to a vibrator 30. In the embodiment shown, the vibrator is a solid bar driven by a plurality of sandwiched piezoelectric wafers connected to an oscillator and amplifier 34. The vibrator 30 causes the dish to flex from the center outwardly, such that motion near the dish perimeter is exaggerated in comparison with motion at the center, thereby producing intense sound at a given frequency, preferably the natural resonant frequency of the dish. The sound source therefore produces a coherent beam of intense sound, which may be coupled to a furnace or used in any sound levitation device. While the use of the dish sound source described herein is preferred, other sound sources, such as pistons, speakers and the like may also be employed.

As shown in FIG. 1, the diaphragm or dish 28 is located in the end of the tube 18 remote from the furnace cavity. A tapered plug 40 in the form of a solid cone is supported in the tube at a slightly spaced relationship from the dish 28. The base of the plug 40 has a diameter which is less than the diameter of the dish but preferably covers a majority of the dish area. The plug 40 may be composed of a refractory or other heat resistant material to shield the surface of the dish from the furnace heat. The plug may be supported in the tube 18 by any convenient means, such as by the arms 42 as shown.

It may be seen in FIG. 1, 2, and 3, that the tube 18 and the plug 40 define a horn, with the sound dish 28 being located in the throat of reduced cross sectional area, and the mouth of larger cross sectional area being connected to the cavity of the furnace. Thus, the vibrating dish 28 is horn loaded, thereby increasing the efficiency or impedance match between the sound source and the air or sound transmitting medium.

FIG. 2 illustrates an important feature of the present invention. The horn is preferably constructed to provide a constant dispersion irrespective of variations in frequency or wavelength which result from temperature gradients.

As sound is emitted from the horn, the angle of dispersion is determined by the relationship between the frequency or wavelength and the wall angle of the horn. At each wavelength, there is a location in the horn, called a "break point" beyond which the horn ceases to act as a transformer for the sound, and the sound is radiated at approximately the angle of the horn walls. The horn of the present invention is designed to assure that the wall angle at the various break points is the same over the wavelengths to be considered.

FIG. 2 shows the radiation angle for a low temperature at A and a higher temperature at B. The mean radiation angle shown at 44 remains constant throughout the length of the horn, and therefore, there is no loss of beaming or focusing of the sound pattern. In the embodiment shown, it may be seen that the mean radiation angle is directed toward a location on a central axis, said location preferably being in the vicinity of the object 20 to be levitated as shown in FIG. 1.

In the embodiment shown in FIG. 2, the tube 18 is a cylindrical surface and the plug 40 is conical. Very obviously, either the inlet tube or the plug could have other configurations to attain constant directivity. The angles are adjusted to provide a constant mean radiation angle as the temperature and wavelength increase from the throat to the mouth of the horn.

FIG. 4 shows another embodiment of the present invention. In this embodiment, the sound source dish 50 is convex in shape which causes the sound to be focused toward a point or limited area. The horn structure 52, again composed of refractory or heat resistant materials has a very narrow opening at the throat 54 which is smaller in diameter than the dish 50. Preferably, the throat in this embodiment is less than one quarter wavelength of the sound, and the sound from the dish 50 is focused toward the throat. Under such conditions, the throat creates a point source of sound, which would radiate equally in all directions if not shaped by the horn.

The horn 50 is flaired from the throat to the mouth 56, which has a diameter that is preferably greater than one-half wavelength of the sound at the temperature of the mouth. The flair rate of the horn wall is adjusted to provide constant directivity or mean dispersion angle for progressively longer wavelength of sound across the thermal gradient from the throat 54 to the mouth 56.

Also, as shown in FIG. 4, it is possible to use various thicknesses of insulation around the horn or to use external heating or cooling means to make adjustments to the thermal gradient. For example, the insulation at the throat may be greater and/or external cooling may be applied to provide thermal protection for the sound source.

Also, to better achieve the desired focusing effect of the FIG. 4 embodiment, a tapered phase plug 58 is inserted between the dish 50 and the throat 54, in order to better focus the sound at the opening of the throat.

As shown in FIG. 1, the levitation apparatus, furnace and associated equipment may be disposed in an air tight pressure vessel 11 together with means for raising the pressure substantially over normal atmospheric pressures, such as by use of a compression pump 13. Increases in pressure in the levitation chamber result in proportional increases in available levitation or radiation forces for the same sound intensity or vibrational amplitude. The pressure is preferably maintained at a level above ten atmospheres.

FIG. 5 illustrates another verison of the acoustic levitation apparatus of the present invention. In this embodiment, the sound source is in the form of an elongated flat or concave dish radiator 60 and is connected to an elongated vibrational drive 62, which may include a series or array of piezoelectric wafers, as shown in the previous embodiment. The radiator 60 is disposed in one end of horn structure comprising a pair of side walls 64 and an elongated tapered plug 66 which is positioned over the radiator as in the previous embodiments. A series of reflectors or an elongated single reflector 68 is positioned above the mouth of the horn. This enables a plurality of objects 70 to be levitated at the same time. This type of apparatus is particularly suitable for production line operations wherein the levitated objects are treated separately or processed on a continuous basis.

FIG. 6 illustrates another embodiment of the invention in which the flexural dish 80 of the sound source and the tapered plug 82 are arranged as aforesaid. In addition, a recirculating pathway 84 is provided behind the circular outer perimeter 86 of the dish 80. The pathway 84 is generally semi-toroidal in shape and the pathlength is one-half of the wavelength of sound being produced by the dish 80.

More specifically, a circular baffle 88 is disposed around and to the rear of the dish, with the rear of the baffle being spaced from a curved wall 90. Sound radiates from the rear edge of the dish, travels in a curved path around the baffle 88 and exits from an opening between the baffle and a side wall 92 of the horn.

The purpose of the pathway 84 is to bring the rearward radiation, which is 180 out of phase with the forward radiation, into the same phase with the primary radiation into the horn, as shown by the arrows. As a result, the dish and driver suffer less stress because of increased efficiency, and less motion is required to produce the same amount of sound. This added feature allows for a 6 db increase in sound output and equalizes the loading on the dish.

We claim:

1. In an acoustic levitation device wherein an object is levitated by acoustic energy from a sound source and is heated while being levitated, the improvement wherein said sound source comprises a dish-shaped member and means for flexing said dish-shaped member to produce sound at the outer perimeter of said member, and means for horn loading and protecting said sound source from heat, said last mentioned means comprising a hollow tube, said dish-shaped member being located in one end of the tube, a insulating member disposed in the tupe and being spaced from the tube and the dish-shaped member, said insulating member having a base coextensive with the dish-shaped member except for the outer perimeter thereof to insulate said dish-shaped member, said insulating member tapering away from the base thereof to provide horn loading for said sound source means.

2. The improvement of claim 1 further comprising means to pressurize said sound transmitting medium.

3. The improvement of claim 1 wherein said dish has a circular perimeter.

4. The improvement of claim 1 wherein said dish is elongated.

5. The improvement of claim 1 wherein said dish has forward and rearward radiation and wherein means are provided for bringing the rearward radiation of said dish into phase with the forward radiation.

6. The improvement of claim 1 wherein said means for horn loading comprises a horn having constant directivity relative to sound wavelength gradients herein caused by thermal gradients in said horn.

7. The improvement of claim 1 wherein said tube is cylindrical.

8. In an acoustic levitation device in which an object is levitated in a chamber by acoustic energy, a sound source is coupled to the chamber, and means are provided to heat the interior of the chamber, the improvement wherein said sound source comprises dish shaped member having an outer perimeter and means for flexing said dish shaped member to produce sound at the perimeter thereof; a hollow tube having one end connected to the chamber and the other end extending away from the chamber, said sound source means being located in said other end; and a tapered plug composed of insulating material, said plug having a base spaced from the sound source means and covering said dish except for the perimeter thereof to protect the sound source means from heat radiation, said plug tapering toward said chamber and providing horn loading for said sound source means.

9. In an acoustic levitation device wherein an object is levitated within a heated chamber by means of a sound source connected by a tube to said chamber, and wherein there is a temperature gradient between said chamber and sound source, the improvement wherein the tube is a horn having a mouth and a throat, with said mouth being larger in area than said throat, said mouth being connected to said chamber and said sound source being disposed in said throat, and means for proving a constant mean radiation angle in said horn between said throat and said mouth to provide a constant sound dispersion irrespective of variations in sound wavelength caused by said temperature gradient.

10. In an acoustic levitation device wherein sound is employed to position or levitate an object in a sound transmiting medium, the improvement comprising sound source means directed toward said object for providing acoustic forces on said object, said sound source means having forward and rearward radiation, means for horn loading said sound source means comprising an air passageway having a throat and mouth larger in area than the throat, with the sound source means being located in the throat, and means for bringing the rearward radiation of the sound source means into phase with the forward radiation.

* * * * *